United States Patent
Guo

(10) Patent No.: US 8,602,845 B2
(45) Date of Patent: Dec. 10, 2013

(54) STRENGTHENING BY MACHINING

(75) Inventor: Changsheng Guo, South Windsor, CT (US)

(73) Assignee: United Technologies Corporation, Hartford, CT (US)

(*) Notice: Subject to any disclaimer, the term of this patent is extended or adjusted under 35 U.S.C. 154(b) by 273 days.

(21) Appl. No.: 13/243,655

(22) Filed: Sep. 23, 2011

(65) Prior Publication Data

US 2013/0075119 A1    Mar. 28, 2013

(51) Int. Cl.
*B24B 1/00* (2006.01)

(52) U.S. Cl.
USPC .......... 451/54; 451/5; 451/7; 451/28; 451/53; 451/449; 451/488

(58) Field of Classification Search
USPC .......... 451/5, 7, 53, 54, 28, 488, 449
See application file for complete search history.

(56) References Cited

U.S. PATENT DOCUMENTS

| | | | | |
|---|---|---|---|---|
| 2,384,225 A | * | 9/1945 | Wilson | 451/7 |
| 2,434,679 A | * | 1/1948 | Wagner et al. | 451/7 |
| 2,677,631 A | | 5/1954 | Gresham et al. | |
| 2,961,394 A | * | 11/1960 | Williams et al. | 204/218 |
| 3,629,979 A | * | 12/1971 | Albers et al. | 451/36 |
| 3,984,213 A | * | 10/1976 | Kelso | 451/53 |
| 4,016,855 A | * | 4/1977 | Mimata | 125/13.01 |
| 4,276,114 A | * | 6/1981 | Takano et al. | 438/471 |
| 4,279,575 A | | 7/1981 | Avery | |
| 4,438,598 A | * | 3/1984 | Wohlmuth | 451/5 |
| 5,203,122 A | * | 4/1993 | Campbell | 451/53 |
| 5,371,975 A | * | 12/1994 | Lundmark | 451/9 |
| 5,430,936 A | | 7/1995 | Yazdzik, Jr. et al. | |
| 5,564,966 A | * | 10/1996 | Nishioka et al. | 451/41 |
| 5,775,980 A | * | 7/1998 | Sasaki et al. | 451/285 |
| 5,803,798 A | * | 9/1998 | Cesna et al. | 451/269 |
| 6,004,102 A | | 12/1999 | Kuefner et al. | |
| 6,007,628 A | | 12/1999 | Ittleson et al. | |
| 6,034,344 A | | 3/2000 | Ittleson et al. | |
| 6,039,634 A | | 3/2000 | Bach et al. | |
| 6,123,606 A | * | 9/2000 | Hill et al. | 451/53 |
| 6,178,852 B1 | | 1/2001 | Pfaff | |
| 6,875,079 B2 | * | 4/2005 | Kegeler | 451/7 |
| 7,432,471 B2 | | 10/2008 | Yamazaki et al. | |
| 7,491,909 B2 | | 2/2009 | Yamamoto et al. | |
| 7,757,745 B2 | | 7/2010 | Luczak | |
| 7,895,872 B2 | | 3/2011 | Mann et al. | |

(Continued)

OTHER PUBLICATIONS

Mori Seiki: The Machine Tool Company. "Grind Hardening: A ground breaking approach to heat treatment." (2011).

(Continued)

*Primary Examiner* — George Nguyen
(74) *Attorney, Agent, or Firm* — Kinney & Lange, P.A.

(57) ABSTRACT

A machining method comprises selecting a finished surface dimension and a material property for a working surface, defining a working temperature range based on the selected material property, and defining a machining power based on the working temperature range. The machining power depends on a removal rate and a specific heat of the working surface. The working surface is machined at the removal rate to achieve the finished surface dimension, and the machine power is controlled to maintain the working surface within the working temperature range. The working surface is heated or cooled from the working temperature range to a transition temperature range, such that the selected material property is preserved in the working surface.

20 Claims, 4 Drawing Sheets

(56) References Cited

U.S. PATENT DOCUMENTS

| | | | |
|---|---|---|---|
| 8,353,739 B2 * | 1/2013 | Frazee et al. | 451/7 |
| 2007/0141965 A1 * | 6/2007 | Juneau et al. | 451/54 |
| 2009/0277009 A1 | 11/2009 | Kotzbacher et al. | |
| 2011/0318994 A1 * | 12/2011 | Darcangelo et al. | 451/41 |

OTHER PUBLICATIONS

DMG Mori Seiki. "Multitask Finishing." retrieved Aug. 11, 2011 from <http://www.dmgmoriseikiusa.com/blog/view/2011-01-24/multitask_finishing>.

* cited by examiner

STRENGTHENING BY MACHINING

BACKGROUND

This invention relates generally to manufacturing, and specifically to machining processes. In particular, the invention concerns machining process for precision parts and components, including jet engine parts and other gas turbine engine components.

Typically, precision parts are manufactured by subtractive machining processes including cutting, milling, drilling, broaching, turning, boring, drilling, sawing, planing, reaming, tapping and turning. In general, the subtractive processes are used to remove material from a workpiece or other stock material, in order to produce the parts with selected geometrical features, including size, shape, tolerance and surface finish.

Machined surfaces may also have other desired physical or material properties, such as hardness, microstructure, and residual stress features. These additional surface properties are achieved by separate manufacturing processes, including heat treatment, shot peening, laser peening, ultrasonic peening, deep rolling, grit blasting and burnishing.

The application of separate machining and surface feature processes provides substantial flexibility in final part and component design. At the same time, separate machining and surface processing procedures can increase capital costs and production time, presenting competing engineering requirements for efficient precision parts manufacture.

SUMMARY

This invention concerns a method for machining a surface on a material. The method includes selecting a finished surface dimension and a material property for the working surface, and defining a working temperature range based on the selected material property. A machining power is also defined, based on the working temperature range. The machining power also depends on the removal rate from the working surface, and the specific energy of the material to be removed.

The surface is machined at the removal rate to achieve the finished surface dimension, and the machining power is controlled to maintain the working surface within the defined working temperature range. The working surface is then heated or cooled from the working temperature range to a transition temperature range, in order to preserve the selected material property in the working surface.

DETAILED DESCRIPTION

Figure 1A:
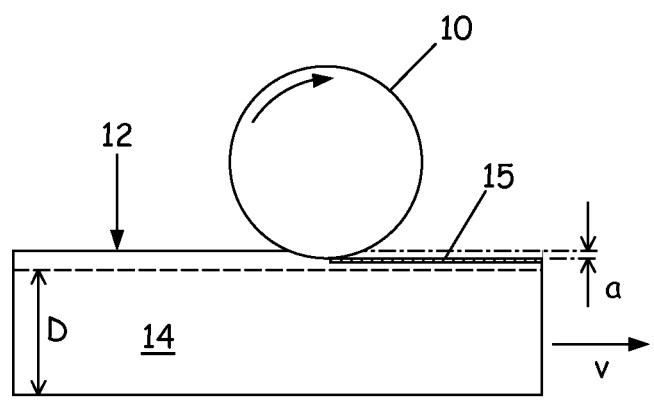
FIG. 1A is a schematic illustration of a traditional machining process.

FIG. 1A illustrates an example of a traditional machining process, in which grinding wheel 10 is used to achieve a particular surface dimension D on working surface 12 of workpiece 14. Grinding wheel 10 has cutting diameter (or width) d, and machines workpiece 14 in a number of individual passes or steps, each step having cutting depth a.

The goal of traditional machining processes such as turning, milling and grinding is to remove excess material from workpiece 14, in order to create surface dimension (or dimensions) D and other geometrical features within the required tolerance, without altering the metallurgical and micro-structural properties of working surface 12 (the machined surface). In order to remove material with grinding wheel 10, however (or other cutting or machine tool), some deformation of working surface 12 is inevitable.

This process results in both mechanical and thermal stress in working surface 12, and in adjacent surface or subsurface layer 15. To reduce or eliminate such machine-induced effects and damage to working surface 12, the final machining steps and finishing processes are designed to remove only a thin layer of material per pass.

In each cutting step, therefore, workpiece 14 (or other working material) is fed into grinding wheel 10 at relatively slow feed velocity v, and the cutting depth (a) is relatively small, as compared to final desired surface dimension D (that is, a<<D). This reduces heating and deformation of workpiece 14 during each cutting pass over working surface 12, but it also increases processing time, reducing productivity and throughput.

Figure 1B:
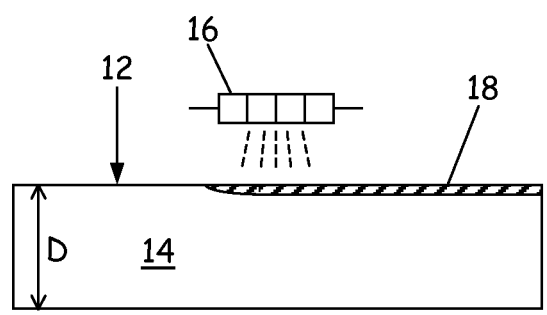
FIG. 1B is a schematic illustration of a traditional surface finishing process.

FIG. 1B illustrates an example of a traditional surface treatment process, in which heat source 16 is used to modify or achieve a selected material or mechanical property in surface layer 18 of working surface 12. In one particular application, heat source 16 is used to soften or anneal working surface 12, creating surface layer 18 with material properties that are distinct from the bulk material properties of workpiece 14.

The depth of surface layer (or subsurface layer) 18 depends on heating time and other treatment parameters. In some applications, the treatment time is extended, so that the bulk material of workpiece 14 achieves the same mechanical or material properties as surface layer 18 on working surface 12.

As shown in FIGS. 1A and 1B, geometrical requirements including surface dimensions are achieved by one process (e.g., machine grinding), and the desired surface properties are achieved by another process (e.g., annealing). Other surface properties such as hardness and compressive residual stress are also obtained by separate manufacturing steps and processes. Heat treatment, for example, can be used to achieve a particular ductility, while separate cooling or shot peening processes are required to achieve desired properties of hardness and residual (compressive) stress.

Figure 1C:
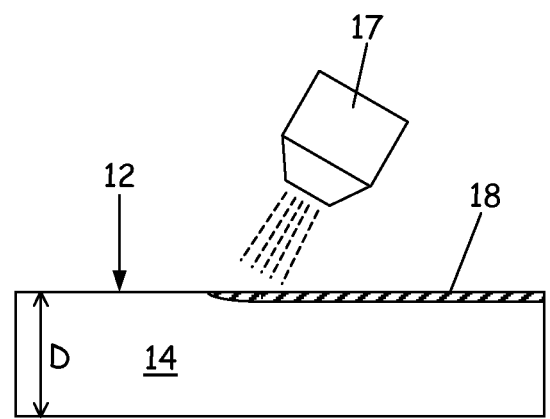
FIG. 1C is a schematic illustration of a traditional surface finishing process, with cooling to produce hardness.

FIG. 1C illustrates an example of another traditional surface treatment process, in which coolant nozzle 17 is used to modify or achieve a selected material or mechanical property in surface layer 18 of working surface 12. In one particular application, coolant nozzle 17 is used to harden working surface 12, creating surface layer 18 with hardness properties that are distinct from the bulk material properties of workpiece 14.

Figure 1D:
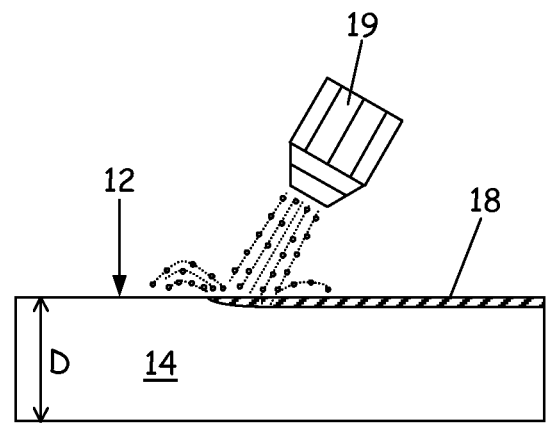
FIG. 1D is schematic illustration of a traditional surface finishing process, with shot peening to produce compressive residual stress.

FIG. 1D illustrates an example of a further traditional surface treatment process, in which shot peening nozzle 19 is used to modify or achieve a selected material or mechanical property in surface layer 18 of working surface 12. In one particular application, shot peening nozzle 19 is used to produce compressive residual stress in working surface 12, creating surface layer 18 with stress properties that are distinct from the bulk of workpiece 14.

These various manufacturing steps also utilize different kinds of equipment, for example a computerized mill or grinding apparatus for the machining process of FIG. 1A, and an annealing oven, coolant nozzle or shot peening apparatus for the surface treatment processes of FIGS. 1B-1D. Between the machining and surface treatment steps, moreover, workpiece 14 may be cooled to ambient temperature, and sometimes stored for a period of time. During this interval, environmental conditions may fluctuate, and the temperature of working surface 12 is uncontrolled. In addition, other processes may also be required, for example washing, polishing and anodizing, or other chemical, mechanical or electrochemical treatments. Each of these separate steps adds to total manufacturing time, increasing production costs and equipment outlay.

Figure 2:
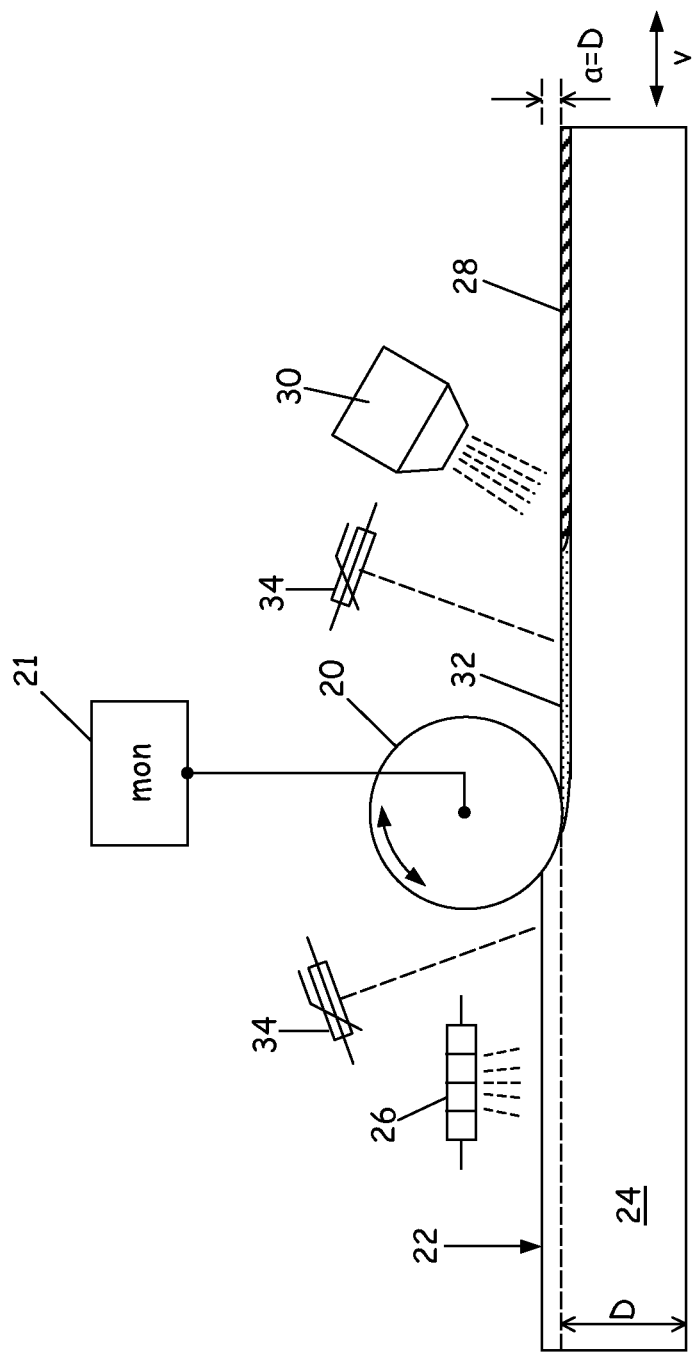
FIG. 2 is a schematic illustration of combined machining and surface finishing process.

FIG. 2 illustrates a combined machining and surface finishing process. In this process, machine tool 20 is used to achieve a particular finished surface dimension D on working surface 22 of workpiece 24. Power monitor 21 monitors the machining power of tool 20 to generate the desired workpiece geometry, as described below, and to achieve selected material or mechanical properties in working surface 22.

Machine tool 20 encompasses one or more of a grinder, end mill, ball mill, shaper, drill, planer or other machine tool, and is adapted to remove material from working surface 22 of workpiece 24 by grinding, cutting, drilling, milling, planning or other machine process. Machine tool 20 has a diameter d, and machines material from working surface 22 at cutting depth a. In a single-pass process, cutting depth a corresponds to finished surface dimension D, so that machine tool 20 achieves surface dimension D in a single pass over working surface 22.

In the combined process of FIG. 2, heater 26 may also be used to pre-heat working surface 22 before machining, in order to achieve the selected mechanical and material properties in machined surface layer 28. In addition, coolant from nozzle 30 may be used to cool heated layer 32 of working surface 22 after machining, in order modify, fix or preserve the selected material properties in machined surface layer 28. Note, however, that the positions of heater 26 and nozzle 30 with respect to machine tool 20 are arbitrary. The heating and cooling elements may be located much closer to the machining or grinding area, or farther away from the machining or grinding area.

Workpiece 24 is formed of metal, metal alloy, polymer, glass, ceramic, wood or other machinable material, including composite materials such as graphite matrix and fiber-based compounds. Machine tool 20 forms geometrical features including finished dimension D onto working surface 22 of workpiece 24, and at the same time provides machined surface layer 28 with selected mechanical properties and stress features.

Heater 26 transfers thermal energy to the material of workpiece 24, heating working surface 22. Machine tool 20 provides additional thermal energy during the machining process, generating a stress concentration in working surface 22 and maintaining heated layer 32 in a desired working temperature range, in order to impart selected material properties such as hardness or ductility.

Nozzle 30 provides a cooling stream to working surface 22, in order to cool working surface 22 from the working temperature range to a transition temperature range, preserving the stress concentrations and fixing the selected material properties into machined surface layer 28. Temperatures are monitored with temperature sensors 34, for example using infrared devices, in order to control the machining, heating and cooling processes to maintain desired working temperatures and transition temperature ranges in working surface 22, both before and after machining by machine tool 20.

Suitable heaters 26 include heat sources such as induction heaters, plasma heaters and laser sources. Suitable coolant streams from nozzle 30 include air, water, oil and inert gasses or fluids, and cryogenic fluid streams such as liquid nitrogen and liquid argon. Alternatively, nozzle 30 provides a heating fluid stream to heat working surface 22 after machining by machine tool 20, or to maintain machined surface layer 28 in a particular transition temperature range.

The direction of feed velocity v can also be reversed (along with the rotational direction of machine tool 20, if necessary), interchanging the relative positions and functions of heating and cooling elements 26 and 30. Thus, heater 26 and nozzle 30 can more generally be used for either heating or cooling purposes, exchanging heat with working surface 22 in either direction to provide a combination of heating and cooling, either before or after machining by machine tool 20.

In contrast to other techniques, the combined machining and surface preparation processes of FIG. 2 do not eliminate or remove the mechanical and thermal effects imparted onto working surface 22 by machine tool 20. Instead, both mechanical and thermal energy from the machining process are utilized to impart stress and strain concentrations and other selected material properties into machined surface layer 28, at the same time that finished surface dimension D is achieved in working surface 22.

The selected material properties of machined surface layer 28 include, but are not limited to, hardness, softness, tensile strength, compressive strength, yield strength, density, ductility, fatigue limit, flexural or shear modulus or strength, specific modulus, Young's modulus, Poisson ratio, fracture toughness, microstructure, surface stress or strain distribution, and electromagnetic or acoustic properties such as conductivity, permeability, diamagnetic or paramagnetic properties, sound absorption and sound velocity. Each of these properties results from the combined machining and surface processing techniques of FIG. 2, based on the heat energy and stress properties imparted onto working surface 22 by machine tool 20, in combination with the pre- or post-machining heating and cooling provided by heater 26 and nozzle 30.

In an annealing process, for example, working surface 22 is heated to a working temperature range, maintained at a suitable annealing temperature based on the recrystallization temperature, and then cooled to fix the desired strength, hardness, ductility, and surface stress properties in machined surface layer 28. In a tempering process, working surface 22 is reheated to a transition temperature range based on the critical temperature of workpiece material 24, in order to achieve desired properties of ductility, hardness and surface strength or "toughness." In a quenching process, working surface 22 is rapidly cooled from the working temperature range to a transition temperature range, in order to prevent slow low-temperature phase transitions and preserve surface stress patterns in machined surface layer 28. These processes also allow for compressive stress patterns to be retained, eliminating the need for a separate peening step.

To accomplish these effects, the machining power must be carefully modeled, monitored, and controlled when removing material from workpiece 24 by operation of machine tool 20, in order to control the thermal energy delivered to working surface 22. In a generic subtractive manufacturing or material removal processes such as grinding, milling, drilling or cutting, for example, machining power P is determined by removal rate Z and specific energy U:

$$P = Z \times U. \quad [1]$$

Removal rate Z is determined by process parameters including the cutting depth (a) and feed rate (v). Specific energy U is the specific cutting energy, which is defined as the energy consumed for removing unit volume of material from workpiece surface 22, and which depends on the mechanical binding strength and other material properties of workpiece 24. Specific energy U ranges from about 1 J/mm$^3$ or lower for soft materials to about 60 J/mm$^3$ or higher for harder materials, including high-strength, high-temperature nickel and cobalt alloys and superalloys.

The temperature rise of machined surface 22 can be calculated using process parameters including cutting depth a, diameter d and feed rate v, along with the thermal properties of workpiece material 24 and the rate of thermal energy transfer. As an example, the surface temperature rise for a generic grinding or removal operation can be calculated from:

$$T^* = K \times \frac{P}{Z} \sqrt{\frac{av}{d}}, \quad [2]$$

where K is a proportionality constant.

Based on Equation 2, machining parameters including feed rate (v) and depth of cut (a) can be adjusted to achieve a particular temperature rise T*. Machining power P is thus used to control the temperature rise, and to maintain a particular working temperature range along heated surface layer 32 of working surface 22.

To maintain a particular working temperature range based on temperature rise T*, for example, machining power P can be controlled based on the following inverted or complementary equation:

$$P = \frac{T*Z}{K} \sqrt{\frac{av}{d}}. \quad [3]$$

Based on this relationship, power monitoring is used to ensure that working surface 22 is maintained in the correct working temperature range, based on the corresponding thermal and mechanical properties of the material being removed (e.g., machined or ground) from workpiece 24.

The material properties of machined layer 28 also depend on the rate of cooling (or heating) provided before and after the machining process. In some applications, for example, pre-heating or pre-cooling is applied, using heater 26 or nozzle 30 to transfer thermal energy into or out of working surface 22 in combination with the thermal energy input from machine tool 20.

Higher rates of cooling can be achieved with a refrigerated or cryogenic coolant, such as liquid nitrogen. Post-machining heating and cooling are also utilized, as described above, in order to maintain a particular transition temperature range to fix, preserve or modify the strength, hardness, stress configuration and other material properties of machined surface layer 28.

In contrast to existing techniques, the combined machining and surface finishing process of FIG. 2 achieves machined surface layer 28 with both the required geometrical dimension, and the desired physical, mechanical and material properties. These techniques are not limited to grinding processes, moreover, but can be applied to a broad range of machining methods including milling, turning, broaching, drilling and super-abrasive machining, in order to produce precision components with a wide range of selected surface properties including hardness, strength, residual stress and microstructure.

Figure 3:
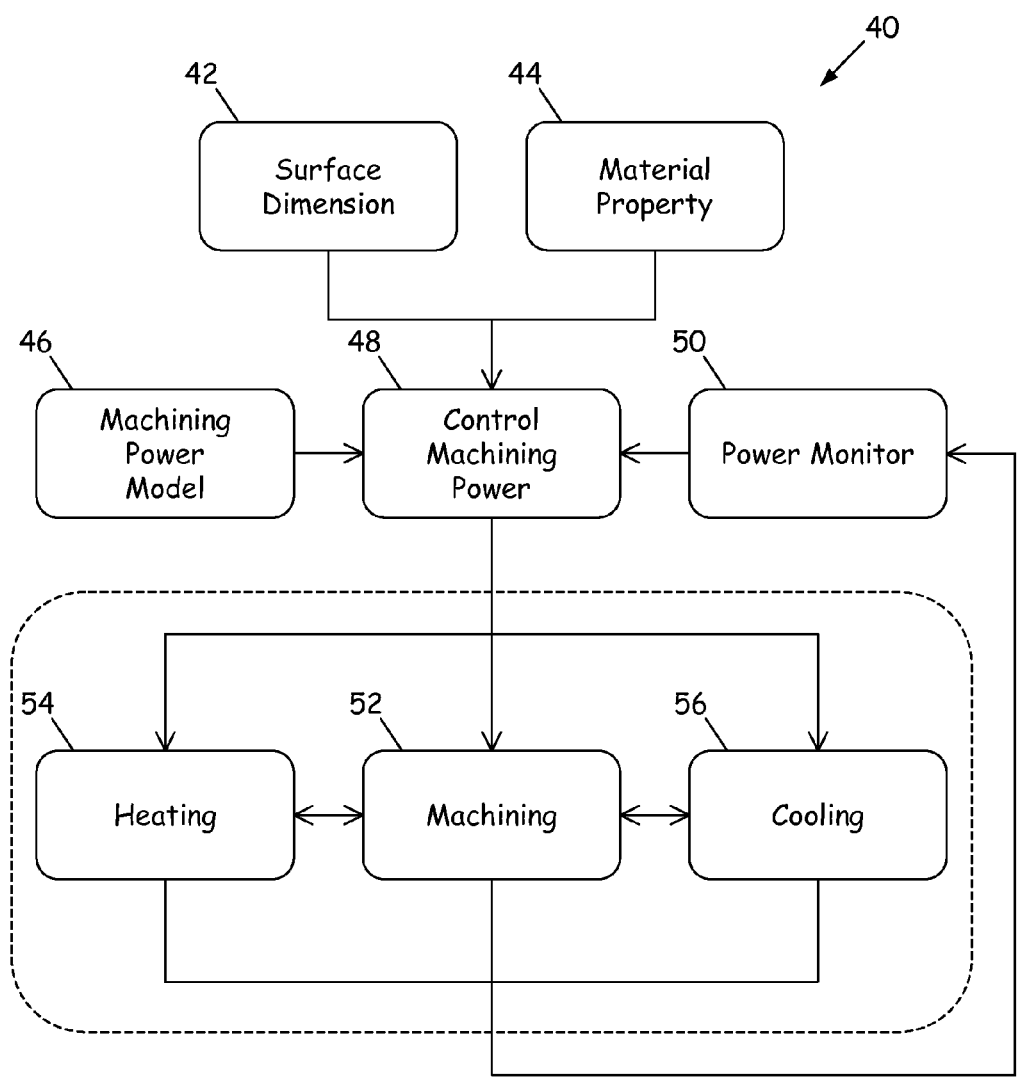
FIG. 3 is a schematic diagram of a method for combined machining and surface finishing.

FIG. 3 is a schematic diagram of method 40 for combined machining and surface finishing. Method 40 encompasses one or more of the following steps: selecting a finished surface dimension (step 42), selecting a material property (step 44), defining a machining power via a machining model (step 46), controlling the machining power (step 48), monitoring the machining power (step 50), machining a working surface (step 52), heating the working surface (step 54), and cooling the working surface (step 56).

Selecting a finished surface dimension (step 42) determines the geometry of the component to be manufactured. Typically, the finished surface dimension is determined within a particular tolerance, based on a selected cutting depth for the working surface. In a one-step process, the cutting depth corresponds to the selected surface dimension, so that desired geometry is achieved in a single pass or machining step.

Selecting a material property (step 44) also defines the desired working temperature range, as appropriate to achieve the selected material property (or properties). Typically, the working temperature range is elevated above a particular phase transition, for example a critical temperature, a recrystallization temperature or a diffusion temperature range, so that the working surface is hot enough to modify the microstructure of the workpiece material, in order to achieve selected mechanical and material properties in the finished working surface.

Defining a machining power (step 46) determines the energy delivered to the working surface during machining (step 52), and the resulting temperature rise. The machining power depends on the cutting rate and the specific energy of the material, and is modeled based on machining parameters including cutting depth, feed rate and tool diameter, as well as the desired temperature rise, removal rate and specific energy of cutting.

Controlling the machining power (step 48) and power monitoring (step 50) are used to determine the temperature rise due to machining (step 52), and to maintain the desired resulting working temperature range on the working surface. The machining power is monitored (step 50) by sensing temperatures before and after machining (step 52), and controlled (step 48) by adjusting machining parameters, for example cutting depth, rotational speed or feed rate. In some applications, the cutting width or diameter can also be adjusted, for example where the final feature size is greater than the physical machine tool diameter, and where the machine tool can be laterally positioned to adjust the removal rate.

In machining (step 52), material is removed from the working surface to achieve the selected surface dimension (step 42), based on the cutting depth. In a one-step process, the cutting depth corresponds to the surface dimension, as described above, so that the final surface geometry is achieved in a single cutting pass. Based on machining parameters including cutting depth and feed rate, machining (step 52) also produces the desired degree of plastic deformation (stress and strain) in the working surface, at the desired strain rate.

Heating (step 54) and cooling (step 56) can be applied before and after machining (step 52), in order to ensure the proper working temperature and transition temperature ranges. In particular, the working surface can be heated (step 54) or cooled (step 56) so that the temperature rise during machining (step 52) results in the proper working temperature range, and the range is maintained by monitoring (step 50) and controlling (step 48) the machining power.

After machining (step 52), the working surface can be cooled (step 56) or further heated (step 54) from the working temperature range to a transition temperature range. The transition temperature range is maintained for the time required to achieve or preserve the selected material or mechanical properties (step 42). This includes both short and long temperature transitions, for example annealing or tempering over a particular time period, or rapidly quenching the working surface by cooling.

Thus, the machined surface layer can be imparted with a selected stress distribution as well as particular material properties. For example, the surface can be produced with a particular geometry in combination with a selected compressive stress and a desired hardness or microstructure, in order to replace separate machining, peening and annealing or tempering steps with a single (combined) machining and surface treatment step.

As shown in both FIGS. 2 and 3, these combined machining and surface preparation techniques simultaneously produce geometrical features (size, dimension, tolerance, shape and surface finish) and selected physical properties (hardness, residual stress condition, and microstructure). To achieve this combination, method 40 controls both the stress and thermal contributions of the machining process, producing the desired degree of stress, strain and plastic deformation at the desired rate (stress or strain rate). Method 40 can also control pre- and post-machining heating and cooling rates to preserve the selected features in the machined surface or subsurface layer, on a precision part having the desired geometry, surface dimensions and tolerances.

These techniques are applicable to machine strengthening, grind hardening, grind strengthening and hybrid processes such as heat assisted (e.g., laser-heated) or cooling-assisted (e.g., cryogenic) machine processes. In addition, method 40 can be adapted to improve traditional machining processes such as turning, milling, drilling, broaching, grinding and super abrasive machining or grinding with cubic boron nitride abrasives, using machine process models (step 46) to predict and control heating and cooling rates, stress and strain patterns, and strain rate.

In particular, method 40 controls and monitors the machining power (see steps 48 and 50, above) to provide both the desired geometry and selected stress and strain characteristics, and preserves these properties in a finished surface having desired hardness and microstructure by heating (step 54) and cooling (step 56) the working surface to maintain the proper working and transition temperature ranges. This substantially lowers manufacturing costs and capital requirements, by combining manufacturing operations and reducing equipment needs. Machining, heating and cooling are also performed in a continuous series, substantially reducing lead time because both the selected surface dimensions and the desired material properties are produced in a single manufacturing step.

These techniques are also relevant to smaller-volume production and development, including the manufacture of gas turbine engine parts and other precision components, in which advanced designs may require high-tolerance geometry with localized surface strengthening, surface hardening and surface stress distributions. In addition, combined machining and surface processing provides a more robust manufacturing process and improved service life, by imparting residual compressive stress and other material and physical properties into the working surface during machining. The selected properties are fixed or locked into the machined surface by careful thermal management and temperature control, maintaining the working surface between desired working and transition temperature ranges before, during and after the machining process. These techniques also avoid uncontrolled heating or cooling during storage or between processing steps, which can lead to undesirable phase transitions and the loss of selected material properties.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. A machining method comprising:
   selecting a finished surface dimension for a working surface;
   selecting a material property for the working surface;
   defining a working temperature range based on the selected material property;
   defining a machining power for the working surface based on the working temperature range, wherein the machining power depends on a removal rate and a specific energy of the working surface;
   machining the working surface at the removal rate to achieve the finished surface dimension;
   controlling the machining power to maintain the working surface within the working temperature range; and
   heating or cooling the working surface from the working temperature range to a transition temperature range, such that the selected material property is preserved in the working surface.

2. The method of claim 1, wherein the steps of machining the working surface and heating or cooling the working surface are performed in a continuous series, such that the working surface is maintained between the working temperature range and the transition temperature range.

3. The method of claim 1, further comprising heating the working surface to the working temperature range.

4. The method of claim 1, wherein heating or cooling the working surface to the transition temperature range comprises annealing the working surface.

5. The method of claim 1, wherein heating or cooling the material surface to the transition temperature range comprises tempering the working surface.

6. The method of claim 1, wherein heating or cooling the working surface to the transition temperature range comprises quenching the working surface.

7. The method of claim 1, wherein controlling the machining power comprises adjusting a feed rate to control the removal rate.

8. The method of claim 7, wherein controlling the machining power comprises adjusting a cutting depth to correspond to the finished surface dimension.

9. The method of claim 8, wherein machining the working surface comprises achieving the finished surface dimension in a single machining pass on the working surface.

10. A method for machining a working surface on a material, the method comprising:
    selecting a finished surface dimension for the working surface;
    defining a cutting depth for the working surface, based on the finished surface dimension;
    selecting a material property for the working surface;
    defining a working temperature range for the working surface based on the selected material property;

defining a machining power for the working surface based on the working temperature range, wherein the machining power depends on a removal rate and a specific energy of the material;

machining the working surface at the machining power to achieve the finished surface dimension at the cutting depth;

controlling the machining power to maintain the working surface within the working temperature range; and heating or cooling the working surface from the working temperature range to a transition temperature range, such that the desired material property is preserved in the working surface.

11. The method of claim 10, further comprising heating the working surface to the working temperature range before the step of machining the working surface.

12. The method of claim 11, wherein the step of heating or cooling the working surface to the transition temperature range is performed after the step of machining the working surface.

13. The method of claim 12, wherein the step of heating or cooling the working surface to the transition temperature range is performed in continuous series with the step of machining the working surface, such that the working surface is maintained between the working temperature range and the transition temperature range.

14. The method of claim 12, wherein heating or cooling the working surface to the transition temperature range comprises quenching, tempering or annealing the working surface to preserve the desired material property in the working surface.

15. The method of claim 10, wherein controlling the machining power comprises adjusting a feed rate to control the removal rate, and wherein machining the working surface comprises achieving the finished surface dimension in a single pass.

16. A single-pass machining method, the method comprising:

selecting a finished surface dimension for a working surface of a material;

defining a cutting depth based on the finished surface dimension;

selecting a material property for the working surface;

defining a working temperature range for the working surface based on the selected material property;

defining a machining power for the working surface based on the working temperature range, wherein the machining power depends on a removal rate and a specific energy of the material;

machining the working surface at the machining power to achieve the finished surface dimension on the working surface at the cutting depth;

controlling the machining power to maintain the working surface within the working temperature range and to achieve the finished surface dimension in a single pass over the working surface; and heating or cooling the working surface from the working temperature range to a transition temperature range, such that the selected material property is preserved in the working surface.

17. The method of claim 16, wherein the steps of machining the working surface and heating or cooling the working surface to a transition temperature range are performed in a continuous series, such that the working surface is maintained between the working temperature range and the transition temperature range.

18. The method of claim 16, further comprising heating the working surface to the working temperature range before the step of machining the working surface.

19. The method of claim 18, wherein heating or cooling the working surface to the transition temperature range comprises annealing, tempering or quenching the working surface after the step of machining the working surface.

20. The method of claim 16, wherein controlling the machining power comprises controlling a feed rate of the material to achieve the cutting depth on the working surface in the single pass.

\* \* \* \* \*